(12) United States Patent
Wiatrowski et al.

(10) Patent No.: US 7,729,380 B2
(45) Date of Patent: Jun. 1, 2010

(54) METHOD AND DEVICE FOR SELECTIVELY TRANSMITTING VOICE BURSTS AND REGENERATED HEADER BURSTS

(75) Inventors: David G. Wiatrowski, Woodstock, IL (US); Donald G. Newberg, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 269 days.

(21) Appl. No.: 12/015,982

(22) Filed: Jan. 17, 2008

(65) Prior Publication Data

US 2008/0175158 A1   Jul. 24, 2008

Related U.S. Application Data (60) Provisional application No. 60/885,911, filed on Jan. 21, 2007.

(51) Int. Cl.
*H04J 3/24* (2006.01)
(52) U.S. Cl. .................... 370/473; 370/464; 370/465; 714/762
(58) Field of Classification Search .............. 714/762; 370/464, 469–474, 352
See application file for complete search history.

(56) References Cited

U.S. PATENT DOCUMENTS 5,375,121 A * 12/1994 Nishino et al. ............... 370/473
5,949,755 A *  9/1999 Uphadya et al. ............. 370/224

FOREIGN PATENT DOCUMENTS

WO   WO2005015774 A   2/2005
WO   WO2005055531 A   6/2005

* cited by examiner

*Primary Examiner*—William Trost, IV
*Assistant Examiner*—Kyle C Kasparek
(74) *Attorney, Agent, or Firm*—Valerie M. Davis (57) ABSTRACT

A computer-readable storage element has code stored thereon that programs a processing device within a communication device to implement a method. The method includes: receiving a plurality of bursts and detecting a failure to receive a preceding header burst; extracting embedded data from the plurality of bursts; determining from the embedded data whether the plurality of bursts comprises valid voice bursts; and when the plurality of bursts comprises valid voice bursts, generating at least one header burst using the embedded data, and transmitting the at least one header burst and the voice bursts.

14 Claims, 7 Drawing Sheets

(PRIOR ART)

METHOD AND DEVICE FOR SELECTIVELY TRANSMITTING VOICE BURSTS AND REGENERATED HEADER BURSTS

TECHNICAL FIELD

The technical field relates generally to communication systems and more particularly to selectively transmitting voice bursts and regenerated header bursts in a conventional digital radio system to improve voice late entry performance in the system.

BACKGROUND

When facilitating calls (either private or group calls) in a communication system such as a two-way radio system, a "late entry" condition may occur. A late entry condition occurs when all or a portion of data embedded in a header signaling is lost during a transmission. Unfortunately, known procedures used during a late entry condition ultimately lead to degradation in performance by an end user.

For example, in accordance with European Telecommunications Standards Institute-Digital Mobile Radio (ETSI-DMR) standard (e.g., ETSI-Technical Specification (TS) 102 361 standard), a transmission includes at least one header burst that precedes a plurality of voice bursts, with the voice bursts comprising a voice superframe. The transmission also includes embedded link control (LC) data as part of the standard protocol. Since the embedded LC data indicates attributes about the transmission such as call type (group or individual call), transmitting unit's identity, identity of the destination such as talk group identifier (TGID), subscriber unit identity (SUID), privacy encryption status such as privacy on/off, etc., the embedded LC data could be used to facilitate late entry when a receiving device misses the at least one voice (and/or Privacy) header burst. However, no method currently exists that effectively uses this embedded LC data to improve performance during a late entry condition.

More particularly, where an intermediary device (such as a base radio repeater that repeats transmissions between a transmitting device and an end user device) is involved in a late entry condition, the intermediary device typically repeats the transmissions to the end user device without first recovering and Forward Error Correction (FEC) decoding the LC data, which leaves this function to be performed at the end user device. A shortcoming with this approach is that without error correction of the embedded LC data at the intermediary device, uplink errors (from the transmitting unit to the intermediary device) and downlink errors (from the intermediary device to the end user device) will net together making LC recovery at the end user device much more difficult, thereby, leading to degraded late entry performance at the end user device.

A further shortcoming with the approach is that the end user device typically must satisfy a number of conditions during a late entry condition before it can unmute and begin interpreting received data. The latency delay experienced while these conditions are satisfied may cause the device to miss portions of the voice transmission. Turning again to an ETSI-DMR transmission, the conditions that the end user device must satisfy to unmute are as follows. First, the end user device detects presence of a radio frequency (RF) carrier. Additionally, a synchronization ("sync") presence is detected such as a data/control burst or a voice burst that includes a sync word. A timeslot is identified and a color code validated, which indicates that the end user device is on the correct system or site. Finally, the entire embedded LC data is extracted, FEC decoded and validated in order for the device to unmute to begin interpreting the received signal.

This extraction, FEC decoding and validation takes some time due to the format of the embedded LC data, which includes 72 bits of information along with a 5-bit checksum that is protected with a block product turbo code (BPTC) scheme, resulting in 128-bits of LC data. That 128-bit result is then interleaved and divided into four LC fragments which are embedded into four voice bursts of the voice superframe, for transmission. Thus, the voice data in a major portion of a transmitted voice superframe cannot be heard because the end user device is busy validating the LC data, and resources will be reserved on a downlink channel for at least an entire length of the voice superframe regardless of whether the transmission is a valid transmission for the end user device to join.

Therefore, a need exists for a method and device that addresses at least some of the shortcomings of past and present techniques used for call set-up when a voice late entry condition exists.

BRIEF DESCRIPTION OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method, a device that implements the method, and a computer-readable storage element storing code thereon for programming the device to perform the method is provided, which improves late entry performance in a communication system. When a device, such as an intermediary device like a base radio repeater, detects a late entry condition (e.g., wherein the device has received a plurality of bursts but has failed to receive a preceding header to the plurality of bursts), the device extracts embedded data from received bursts. If the device determines from the embedded data that the plurality of bursts comprises valid voice bursts, then the device generates one or more header bursts and transmits the header and the voice bursts to a second device.

In a more specific embodiment, the device performs a complete and successful embedded link control (LC) recovery from a voice superframe comprising a plurality of voice bursts, received during an uplink transmission on an uplink channel. Accordingly, the device synthesizes a voice header and/or voice privacy header; transmits the header(s) with appropriate timing on a downlink channel; and then begins repeating the voice bursts.

Embodiments described herein improve voice late entry performance by providing a high integrity message to all subscriber units monitoring the downlink channel. This results in a more timely and more reliable late entry method for joining voice transmissions that is more consistent across multiple subscriber units, which works to increase the likelihood of successful and more timely radio communication.

Embodiments described herein are applicable to late entry conditions on an uplink channel (e.g., from a subscriber unit to a base radio repeater), which can occur in systems where uplink signal strength is weak due to low transmit power subscriber units being used or subscriber units transmitting at the fringe of the system. A late entry condition on the uplink affects all subscribers monitoring the channel, and a repeater can coordinate the system's late entry recovery using embodiments described herein.

Embodiments described herein are not limited, however, to implementation on the uplink but can also be implemented on a downlink channel (e.g., from a base radio repeater to a subscriber unit) without loss of generality. Such a scenario may occur, for example, when a particular subscriber unit has either just joined the channel (e.g., at power on or channel change to a selected channel) or when a subscriber unit is operating on the fringe of the system. Moreover, it can be envisioned that embodiments may further be implemented in a system that implements peer-to-peer communication without a base radio repeater. In such a system, a subscriber unit acts as an intermediary device and implements the techniques described herein. Moreover, in a further embodiment, the teachings herein are implemented between two base radio repeaters.

Figure 1:
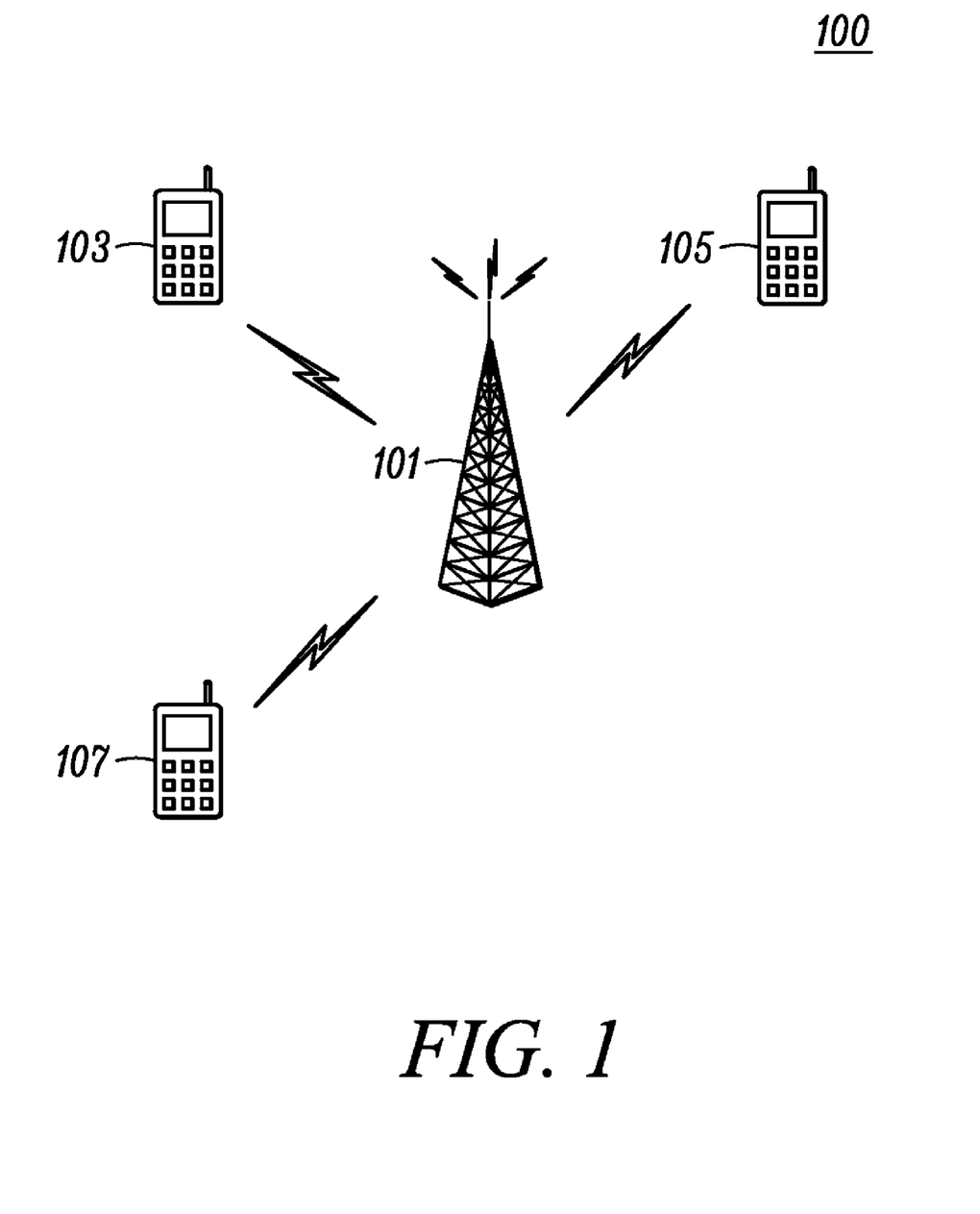
FIG. 1 is a block diagram of a two-way radio system designed to allow the implementation of embodiments.

Referring now to the figures, and in particular FIG. 1, a two-way radio system is shown and generally indicated at 100. System 100 in this embodiment is a conventional digital radio system the general operation of which is well known in the art and will not be detailed here for the sake of brevity. System 100 is shown with a plurality of subscriber units (SU) 103, 105 and 107 that can communicate via an intermediary base radio repeater (BR) apparatus 101 using communication links (also referred to herein as channels). Communication links or channels comprise the physical wireless communication resources over which information is sent between the BR and each SU. In accordance with embodiments described herein, a channel can comprise an uplink channel for transmissions from a SU to a BR and a downlink channel for transmissions from a BR to a SU.

Each of the subscriber units and the repeater 101 comprise a conventional radio receiver apparatus designed to allow the receiving of bursts, a conventional radio transmitter apparatus designed to allow the transmitting of bursts and a processing device that can be adapted, configured, and designed to allow operation in accordance with the teachings herein for implementing embodiments of the invention. A burst is defined in general as a discreet signaling unit having a number of bits and a format as defined by a protocol implemented by the devices to transmit and receive the signaling units.

As used herein, a BR is infrastructure equipment that can receive bursts in a wireless signal from a SU and transmit the bursts in wireless signals to one or more other SUs via the communication channels. A BR includes, but is not limited to, equipment commonly referred to as base transceiver stations, site controllers, access points, or any other type of interfacing device in a wireless environment. As referred to herein, a SU includes, but is not limited to, devices commonly referred to as mobile radios, mobile stations, access terminals, user equipment, mobile devices, or any other device capable of operating in a wireless environment. Examples of SUs include, but are not limited to, two-way radios, mobile phones, cellular phones, Personal Digital Assistants (PDAs), laptops and pagers.

Only one repeater 101 and three subscriber units are shown for ease of illustration. However, system 100 can include any number of base radio repeaters to support any number of subscriber units based on system requirements. Moreover, embodiments are not dependent on the protocol(s) used to facilitate communications in the system and can be used with any such protocols such as those in accordance with the ETSI-DMR standard, as described herein. Moreover, although the system 100 is described as a two-way radio system, embodiments herein can be implemented in any communication system setting having devices that communicate using any type of wireless or wireline interface.

Figure 2:
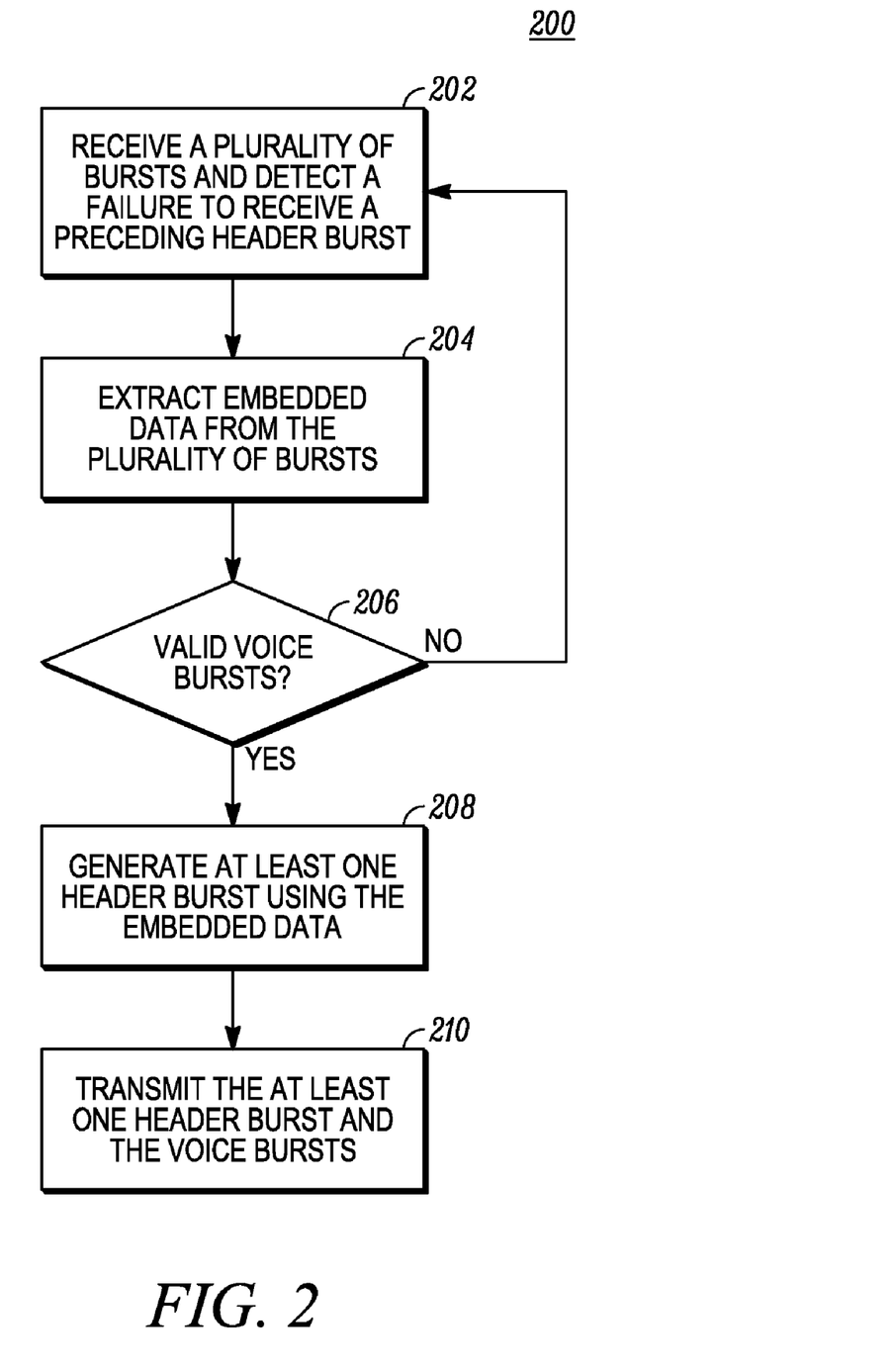
FIG. 2 is a method for selectively transmitting voice bursts and regenerated header bursts in accordance with an embodiment.

FIG. 2 illustrates a method 200 for selectively transmitting voice bursts and regenerated header bursts in accordance with an embodiment. Method 200 is described by reference to an illustrative implementation in repeater 101, but could also be implemented in one or more of the subscriber units 103, 105, 107. At 202, repeater 101 receives a plurality of bursts from subscriber 103 on an uplink channel and detects a failure to receive a preceding header burst (i.e., a header burst that immediately precedes the transmission of the plurality of bursts). For example, the repeater might detect a predefined burst in the plurality of bursts (such as a voice burst that includes sync bits) that indicates to the repeater the failure to receive the preceding header burst. Repeater 101 extracts (204) embedded data from the plurality of bursts and determines (206) from the embedded data whether the plurality of bursts comprises valid voice bursts. In a further implementation, as the repeater determines whether the plurality of burst comprises valid voice bursts, the repeater signals that the uplink channel is busy so that no other subscriber units attempt to use the uplink channel during that time.

Determining 206 can include, for example, detecting a location code in the embedded data (e.g., a color code) and determining based on at least one criterion whether the detected location code is valid. These criteria can in some implementations be adjusted according to current transmission conditions such as by setting detection thresholds to be more stringent as more data becomes available. In this manner, the BR can use the at least one criterion to more reliably determine whether a subsequent plurality of bursts comprises valid voice bursts. Moreover, determining 206 can further include detecting LC data in the embedded data and determining whether the link control data is valid by, for instance, FEC decoding the LC data and determining whether the LC data was successfully FEC decoded.

Upon the repeater 101 positively determining that the plurality of bursts comprises valid voice bursts, the repeater 101 (at 208) generates at least one header burst using the embedded data. The at least one header burst may include one or more voice header bursts or may include a privacy header if the repeater further detects that the plurality of bursts includes a privacy indication, which indicates that the plurality of bursts is protected using some suitable confidentiality mechanism. The repeater then transmits (210) the generated (synthesized) header(s) and the voice bursts to one or more subscriber units on a downlink channel.

Of course, upon receiving the plurality of bursts and detecting a failure to receive a preceding header burst, the repeater may determine that the plurality of bursts does not comprise valid voice bursts. In an implementation, instead of signaling the uplink channel as busy for a predefined minimum length of time (e.g., at least the time to send one entire voice superframe), the repeater can signal the uplink channel as idle at any point during the voice superframe upon determining that the plurality of bursts does not comprise valid voice bursts. The repeater 101 then continues to monitor the uplink channel until it receives (202) a subsequent plurality of bursts.

Figure 4:
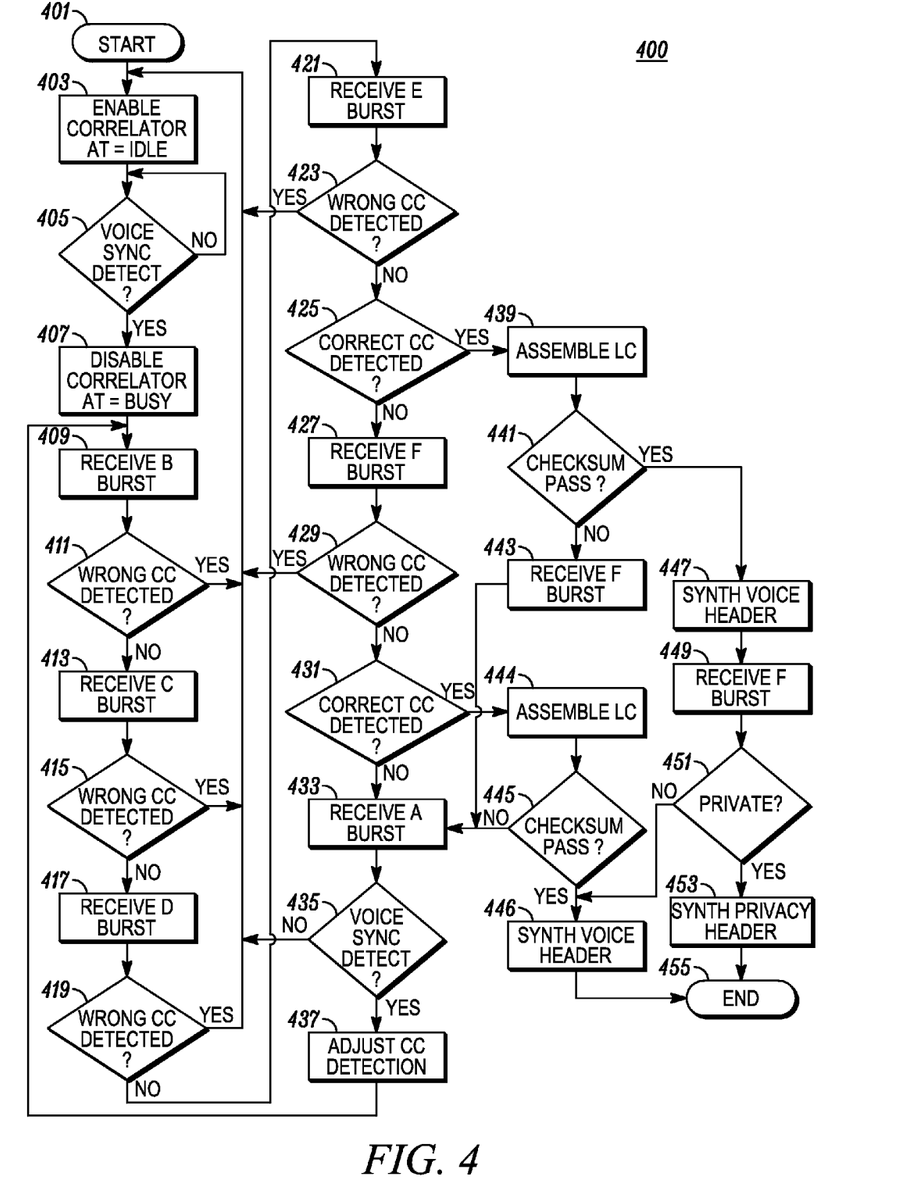
FIG. 4 is a flow diagram illustrating a more detailed method for selectively transmitting voice bursts and regenerated header bursts in accordance with an embodiment.

FIG. 4 is a flow diagram illustrating a more detailed method 400 for a device (e.g., a repeater) to selectively transmit voice bursts and regenerated header bursts in a communication system to improve call setup for other devices during a late entry condition. In general, the method describes the qualifiers used by the repeater for determining when a voice header should be generated and sent by the repeater, and further describes recovering information needed to synthesize the voice header. The method is described with respect to a late entry condition occurring at a repeater on an uplink channel. A late entry condition at the repeater is typical in systems where the uplink signal strength is relatively low due to one or more subscriber units having a low transmit power or subscriber units transmitting at the fringe of the system BR coverage. When the uplink transmission fails (e.g., by a failure of the repeater to receive the header), the lost data for setting up a call equally affects all subscribers monitoring the channel. Therefore, it is highly beneficial to improve late entry performance due to this type of uplink failure.

In order to facilitate understanding the embodiments described herein, FIG. 4 is described as being illustratively implemented in an ETSI-TS 102 361 conventional system that uses standards such as Association of Public Safety Communications Officials (APCO) Project 25 (TIA 102). As noted herein, the ETSI-TS 102 361 standard defines the use of a voice superframe comprising six (6) individual time division multiple access (TDMA) bursts. The last five (5) bursts of the voice superframe include embedded signaling in the center of the burst, including embedded LC data, embedded color code, and embedded null bits.

Figure 3:
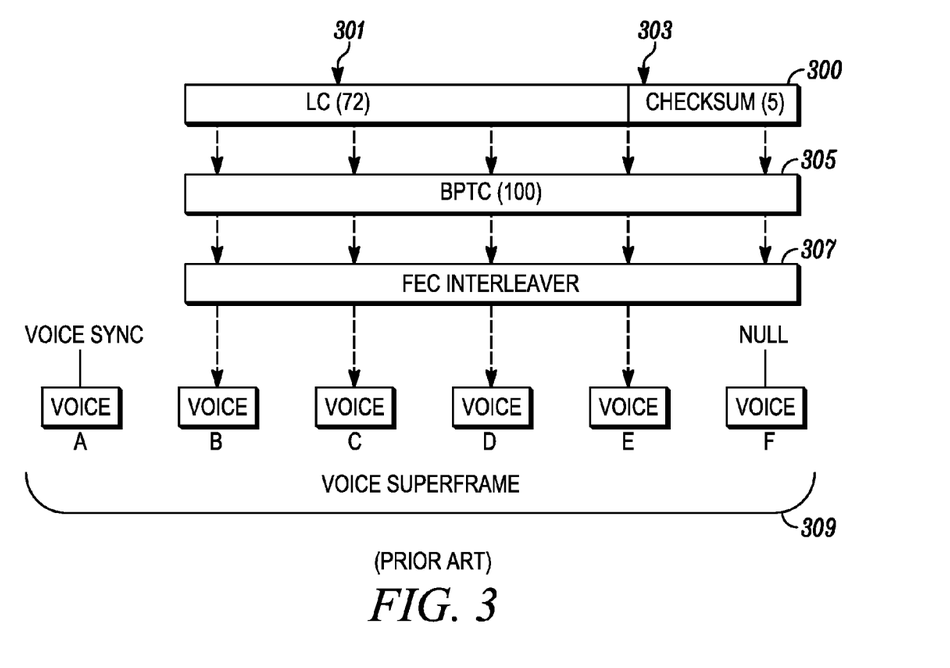
FIG. 3 is a block diagram of an inbound voice superframe as defined in the ETSI-TS 102 361 standard, for illustrating a method for selectively transmitting voice bursts and regenerated header bursts in accordance with an embodiment.

FIG. 3 illustrates a block diagram of an inbound voice superframe 309 as defined in the ETSI-TS 102 361 standard. The voice superframe 309 comprises voice bursts A through F, with burst A including sync bits, and burst F being a null burst. FIG. 3 further illustrates LC data 300 being embedded into the voice superframe. This LC data is also embedded into a voice header burst (also referred to herein as a link control or LC header and is not shown) immediately preceding the voice superframe. This preceding LC header is, of course, useless to a receiving device if the LC header is lost during transmission, as in the case of a late entry condition. The ETSI-DMR LC data 300 includes 72 bits of information 301 along with a 5-bit checksum 303, which is protected with a block product turbo code (BPTC) scheme 305. This produces a resulting 128-bit field. The 128-bit result is interleaved 307 and divided into four LC fragments, which are embedded into the second (Burst B) through fifth (Burst E) bursts of a voice superframe 309.

A common announcement channel is used between time division multiple access (TDMA) channels that includes 2 bits of significance, namely a TDMA channel (TC) and an access type (AT) bit, which indicates the status of a channel. For example, the repeater can use the AT bit to indicate on a downlink channel that the uplink channel is either idle (free) or busy. When the AT bit is set to a busy status, polite subscribers should not attempt transmission. However, when the AT bit is set to idle, polite subscribers may attempt transmission. In normal voice call entry situations, the AT bit is set to one state (busy or idle) and this continues for a minimum of the length of one superframe (360 msec). However, setting the AT bit to busy for an entire superframe when an invalid subscriber (having an incorrect color code) has caused a frame sync correlation is undesirable since valid polite subscribers are effectively prevented from accessing their own repeaters during the transmission of these correspondingly invalid voice bursts. The embodiments as described herein advantageously allow the AT bit to be transitioned in less than the time of one superframe interval.

Turning now to the details of method 400 that start at 401, when not processing voice superframes, the repeater at 403 sets the AT bit for the uplink (inbound) channel to "idle" and monitors the inbound channel for transmission using a synchronization correlator. The BR further transmits idle bursts on the downlink (outbound) channel. Upon receiving an inbound burst, the BR uses the synchronization correlator to determine (405) whether it detects voice synchronization (e.g., indicated by sync bits recovered from the burst). If no voice synchronization is detected, the BR returns to monitoring (403) the uplink channel for an inbound transmission.

If voice synchronization is detected at 405, the BR has received the A burst. This indicates a late entry condition when the BR has also failed to detect a preceding LC header, as in this scenario. Accordingly, the BR (at 407) sets the AT bit to "busy" for the inbound channel, disables the synchronization correlator; and enables a pattern matcher that uses various algorithms to determine whether the BR has received a valid voice superframe.

In determining whether the BR has received a valid voice superframe, the BR determines whether the received bursts have embedded therein a valid color code. As is known in the art, the color code is typically a unique digital code value assigned to each repeater in a wide area or cellular type network. A BR receives a valid voice superframe when the voice superframe bursts comprise a color code assigned to the BR, thereby indicating a valid color code. A color code that does not match that assigned to the receiving BR, on the other hand, indicates an invalid color code. In a normal voice call entry (in contrast to a late entry condition) the color code is carried in the voice and/or privacy header and can be used by the receiving device to validate the color code. However, in this scenario since the header burst(s) have been lost and since color code is not embedded in the A burst, the BR cannot immediately validate the color code. It instead validates (or invalidates) color code using embedded data in one or more subsequent bursts in the voice superframe. Thus, initially the BR sets a color code validation state to undetermined (or unknown) and uses the pattern matcher to perform color code validation.

In an embodiment, the pattern matcher uses a majority-voting algorithm to validate the color code, which typically uses embedded color code data from more than one burst to make a positive determination as to a valid or an invalid color code to guard against a false determination of valid voice bursts, since the FEC used by the BR is susceptible to errors. Thus, after each burst (other than the initial A burst which contains sync), the repeater continues the majority voting process until this process provides a definitive determination that the color code is invalid (wherein the BR returns to 403 in method 400, which can occur in the middle of a voice superframe) or that the color code is valid (wherein the BR ceases using the majority voting process) and continues with embedded LC recovery.

Returning again to the flow diagram shown in FIG. 4, the B burst is received 409 and a determination is made if an incorrect color code has been detected 411. As long as the result of the majority voting process is not an invalid color code, method 400 continues with the receipt of the C burst (at 413), D burst (at 417), E burst (at 421) and F burst (at 427) and the corresponding respective checks (at 415, 419, 423, 425, 429, and 431) regarding the validity or invalidity of the color code.

Once the repeater has received an E burst (at 421) or F burst (at 427), a full link control (LC) field is available. If the correct color code has been positively verified as valid (correct) at 425 or 431, the extracted LC field is FEC decoded and assembled at 439 or 444, and the corresponding checksum field checked at 441 or 445. If the checksum passes this check, this indicates that the LC data was successfully decoded, thereby verifying the validity of the LC data. Accordingly, the BR synthesizes one or more headers (the number and type depending on various scenarios) and transmits the headers and repeats all of the valid voice bursts on the downlink channel. Method 400 then ends (455) and can be re-started at 401. If the LC data cannot be verified, after the BR finishes processing (at 443) the current voice superframe, the BR sets the AT bit to idle and enables the synchronization correlator to detect and process the next voice superframe (e.g., starting at 433 and 435). Whenever a new voice superframe is detected 435, the repeater may adjust (437) one or more criterion of the color code validation algorithm, and apply these adjusted criteria in the color code validation process involving subsequent bursts. In an embodiment, one or more thresholds may be set more stringent as more and more data is available.

Turning again to the scenarios for header regeneration, in one scenario the color code is validated (at 425), and the checksum passes the check (at 441) before the F burst is received (at 449). In this case, the BR synthesizes two headers bursts, with at least one of the header bursts being a voice LC header burst synthesized (447) using the extracted LC data. If the BR detects (at determination 451) a privacy indication (e.g., a PF (protect flag) bit in the voice superframe that indicates Privacy), then the BR also synthesizes (453) and transmits a privacy header burst as the second header burst. Otherwise, if the PF bit indicates No Privacy, two preceding voice header bursts are generated and transmitted. In another scenario, the color code is validated (at 431), and the checksum passes the check (at 445) after the F burst is received (at 427). In this case, the BR synthesizes (446) only one voice header bursts to transmit prior to repeating the valid voice bursts. This occurs since there is only time to transmit a single header, and a voice header is generally more critical than a privacy header. This strategy maximizes the likelihood of successfully transmitting headers to the receiving subscribers while maintaining minimal throughput delay through the repeater.

Figure 5:
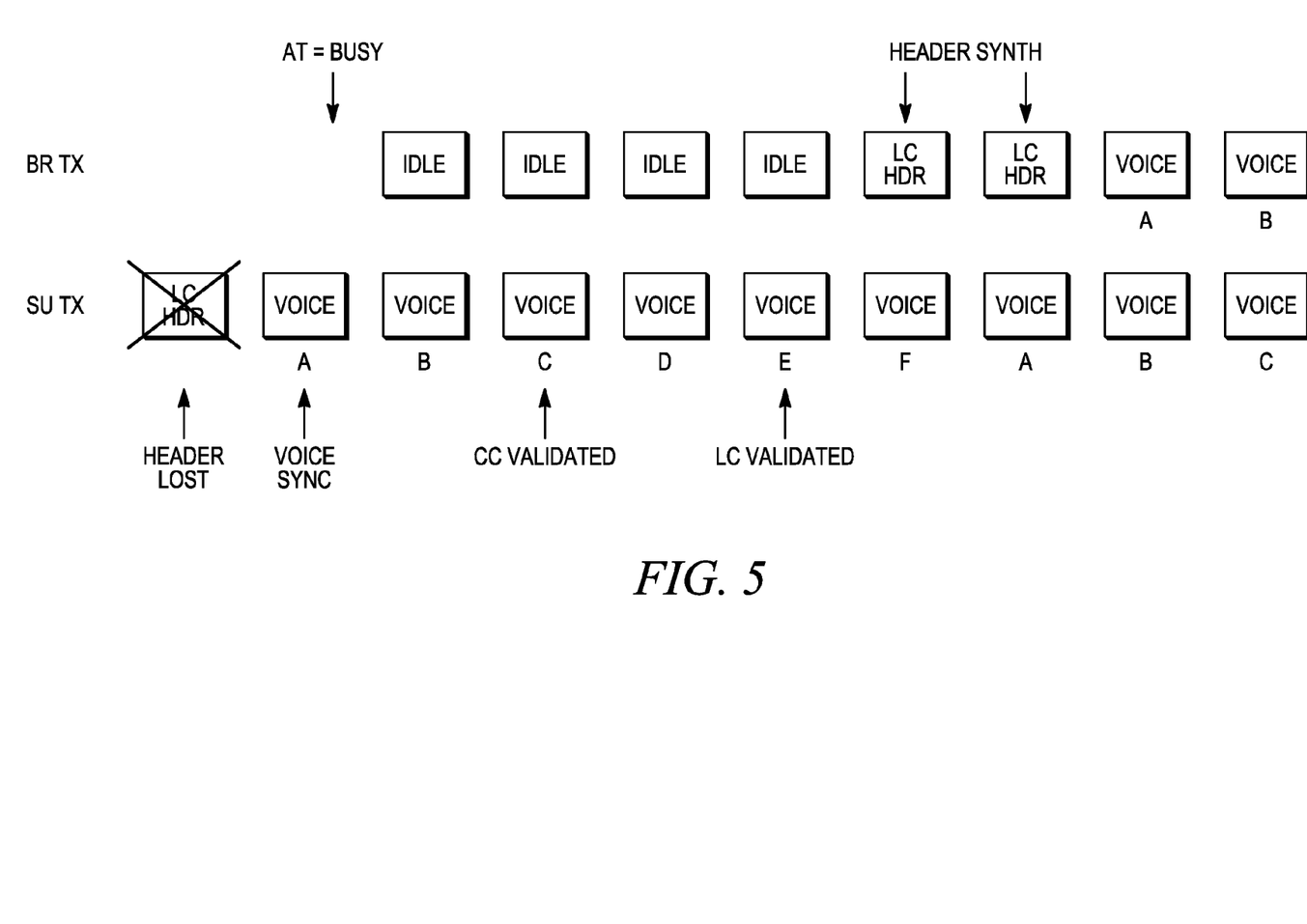
FIG. 5 illustrates a first embodiment of transmitting unit and repeater unit transmit signaling during a late entry condition, wherein the method shown in FIG. 4 is used.

FIG. 5 illustrates a first embodiment of transmitting unit and repeater unit transmit signaling during a late entry condition, wherein the method shown in FIG. 4 is used. In this case, the repeater synthesizes two voice headers. In this scenario, a subscriber unit transmits consecutively in time and in accordance with the ETSI-DMR standard a preceding LC header (termed an "LC HDR", a first voice superframe comprising voice bursts A, B, C, D, E and F and a second voice superframe, wherein only voice bursts A, B and C of this transmission are shown. Voice burst A in the first voice superframe comprises synchronization bits.

The LC header is lost (shown in the figure by the LC header burst having an "X" over it) and doesn't reach an intended base radio repeater, thereby creating a late entry condition at the BR. The BR detects this late entry condition when it receives voice burst A in the first voice superframe, which has synchronization bits indicating the start of voice transmission, but detects a failure to receive the preceding LC header. Upon detecting the late entry condition, the BR implements the method of FIG. 4. Using this method, the BR disables the frame sync correlator and enables the frame sync pattern matcher, sets the AT bits for the uplink channel from idle to busy, and begins transmitting idle bursts on a downlink channel. The BR extracts embedded data including embedded link control data and embedded color code from each voice burst (except burst A) and uses an algorithm to determine whether the color code is valid. After operating on voice burst C, the BR positively determines that the color code is valid and can cease using the algorithm to validate the color code, but continues the link control recovery.

The BR validates the link control data after voice burst E, thereby determining that it has received valid voice bursts (A, B, C, D and E). Thereafter, the BR synthesizes or generates two LC headers using the embedded link control data and color code. After transmitting four idle bursts on the downlink channel to one or more SUs, the BR transmits the two LC headers and then begins repeating the voice superframes to the SUs, wherein only bursts A and B of the first superframe transmission are shown.

Figure 6:
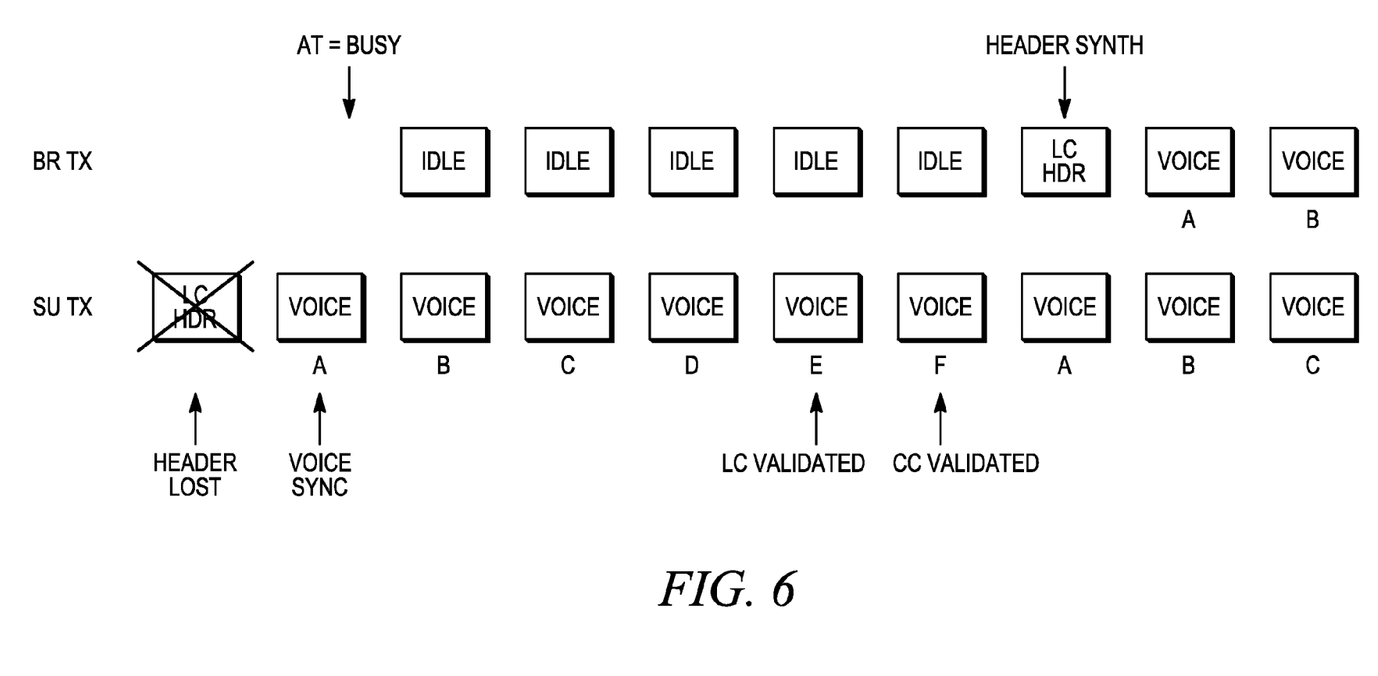
FIG. 6 illustrates a second embodiment of transmitting unit and repeater unit transmit signaling during a late entry condition, wherein the method shown in FIG. 4 is used.

FIG. 6 illustrates a second embodiment of transmitting unit and repeater unit transmit signaling during a late entry condition, wherein the method shown in FIG. 4 is used. The scenario shown in this example is similar to that shown in FIG. 5, except that the BR does not validate the color code until burst F of the first voice superframe. Accordingly, the repeater synthesizes a single voice header to precede the transmission of the voice superframes.

Figure 7:
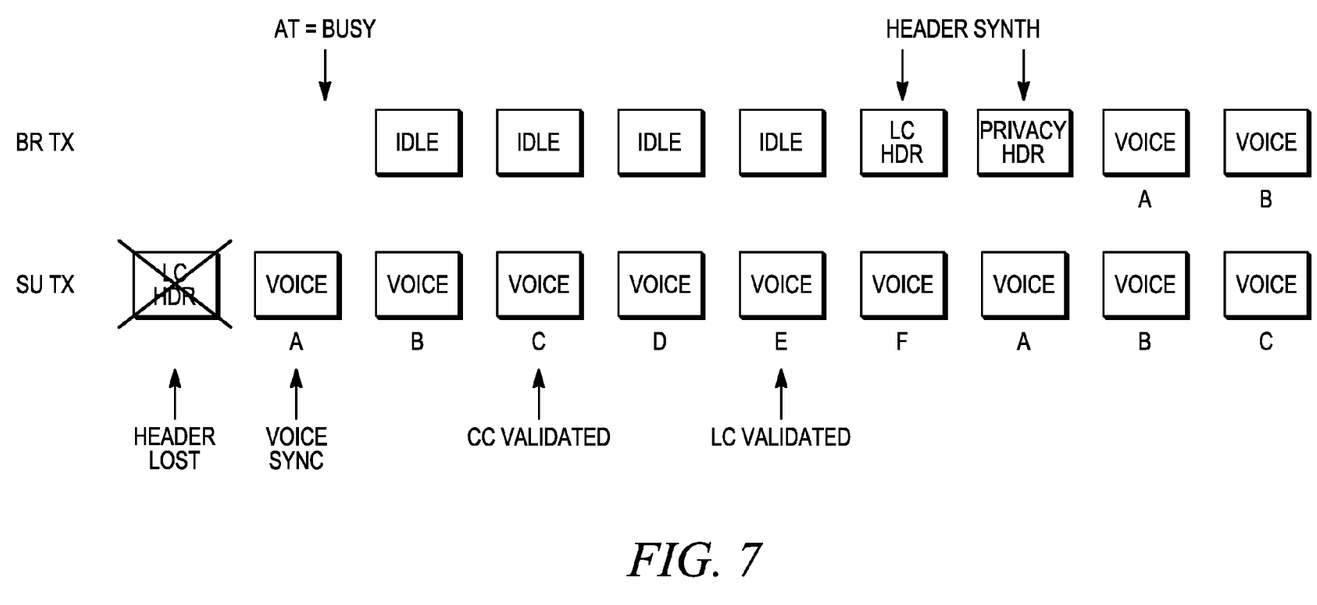
FIG. 7 illustrates a third embodiment of transmitting unit and repeater unit transmit signaling during a late entry condition, wherein the method shown in FIG. 4 is used.

FIG. 7 illustrates a third embodiment of transmitting unit and repeater unit transmit signaling during a late entry condition, wherein the method shown in FIG. 4 is used. The scenario shown in this example is similar to that shown in FIG. 5, except that the BR detects a privacy indication in the voice superframe. Accordingly, the repeater synthesizes one voice header and one privacy header to precede the transmission of the voice superframes.

The teachings disclosed herein describe embodiments that refrain from repeating a voice transmission on a downlink channel until the inbound transmission has been positively determined to be a proper late entry voice signal. This is important because once a subscriber receives a voice sync, it must process all of bursts B through burst F as voice. Moreover, using the disclosed methods, a device doesn't fully commit itself to processing the suspected voice transmission until it is completely validated. Accordingly, a device can abandon processing of a given inbound transmission when it determines that the transmission is invalid, without additional complication of coordinating the shutdown of the downlink channel. In addition, the header synthesis by a device implementing the teachings herein improves voice late entry performance by providing a high integrity message (with the Voice Header(s)) to all subscriber units monitoring the downlink channel. This results in a more timely, consistent, and reliable late entry joining of voice transmissions, which increases the likelihood of successful and more timely radio communication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for forwarding bursts to facilitate late entry to a transmission described herein. The non-processor circuits may include, but are not limited to, a radio receiver, a radio transmitter, signal drivers, clock circuits, power source circuits, and user input devices. As such, these functions may be interpreted as steps of a method to perform the forwarding of bursts to facilitate late entry to a transmission described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method as performed by a device for selectively transmitting voice bursts and regenerated header bursts, the method comprising:

receiving a plurality of bursts and detecting a failure to receive a preceding header burst;

extracting embedded data from the plurality of bursts;

a processing device designed to allow determining from the embedded data whether the plurality of bursts comprises valid voice bursts;

wherein determining comprises:

detecting a location code in the embedded data; and determining, based on at least one criterion, whether the detected location code is valid; and when the plurality of bursts comprises valid voice bursts, generating at least one header burst using the embedded data, and transmitting the at least one header burst and the voice bursts.

2. The method of claim 1 further comprising detecting a predefined burst in the plurality of bursts, which indicates the failure to receive the preceding header burst.

3. The method of claim 2, wherein the predefined burst is a voice burst comprising synchronization bits.

4. The method of claim 2 further comprising signaling a busy uplink channel while determining whether the plurality of bursts comprises valid voice bursts.

5. The method of claim 1, wherein the location code comprises a color code.

6. The method of claim 1, further comprising adjusting the at least one criterion to determine whether a location code detected in a subsequent plurality of bursts is valid.

7. The method of claim 1, wherein the plurality of bursts were received on an uplink channel, the method further comprising: when the detected location code is invalid, signaling that the uplink channel is idle and returning to receiving bursts on the uplink channel.

8. The method of claim 1, wherein determining whether the plurality of bursts comprises valid voice bursts comprises:
    detecting link control data in the embedded data; and
    determining whether the detected link control data is valid.

9. The method of claim 8, wherein determining whether the detected link control data is valid comprises:
    forward error correction (FEC) decoding the detected link control data, and determining whether the link control data was successfully FEC decoded.

10. The method of claim 1 further comprising:
    detecting that the plurality of bursts comprises a privacy indication; and
    generating a voice header burst and a privacy header burst as the at least one header burst.

11. The method of claim 1, wherein the voice bursts comprise a voice superframe as defined in European Telecommunications Standards Institute Technical Specification 102 361.

12. A device for selectively transmitting voice bursts and regenerated header bursts, the device comprising:
    receiver apparatus designed to allow receiving of a plurality of bursts;
    a processing device designed to allow,
        detecting a failure to receive a header burst preceding the plurality of bursts;
        extracting embedded data from the plurality of bursts;
        detecting a location code in the embedded data;
        determining, based upon at least one criterion, whether the detected location code is valid;
        detecting link control data in the embedded data;
        forward error correction (FEC) decoding the detected link control data, and determining whether the link control data was successfully FEC decoded to determine whether the detected link control data is valid; and
        when both the location code and the link control data are valid, generating at least one header burst using the embedded data; and
    transmitter apparatus designed to allow transmitting of the at least one header burst and the plurality of bursts.

13. The device of claim 12, wherein the apparatus comprises a base radio repeater designed to allow the receiving of the plurality of bursts on an uplink channel from a first subscriber unit and the transmitting of the plurality of bursts on a downlink channel to a second subscriber unit.

14. A computer-readable storage element having computer readable code stored thereon for programming a computer to perform a method for selectively transmitting voice bursts and regenerated header bursts, the method comprising:
    receiving a plurality of bursts and detecting a failure to receive a preceding header burst;
    extracting embedded data from the plurality of bursts;
    the computer readable code causing a processing device designed to allow determining from the embedded data whether the plurality of bursts comprises valid voice bursts;
    wherein determining comprises:
    detecting a location code in the embedded data; and
    determining, based on at least one criterion, whether the detected location code is valid: and
    when the plurality of bursts comprises valid voice bursts, generating at least one header burst using the embedded data, and transmitting the at least one header burst and the voice bursts.

\* \* \* \* \*